US010534683B2

(12) United States Patent
Fluman et al.

(10) Patent No.: US 10,534,683 B2
(45) Date of Patent: Jan. 14, 2020

(54) COMMUNICATING OUTSTANDING MAINTENANCE TASKS TO IMPROVE DISK DATA INTEGRITY (71) Applicant: International Business Machines Corporation, Armonk, NY (US)

(72) Inventors: Mudi M. Fluman, Haifa (IL); Yaacov Frank, Ramot Meir (IL); Janice M. Girouard, Austin, TX (US); Yehuda Shiran, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 14/013,154

(22) Filed: Aug. 29, 2013

(65) Prior Publication Data
US 2015/0067252 A1 Mar. 5, 2015

(51) Int. Cl.
G06F 11/34 (2006.01)
G06F 11/30 (2006.01)
G06F 9/50 (2006.01)

(52) U.S. Cl.
CPC ............ *G06F 11/34* (2013.01); *G06F 9/5083* (2013.01); *G06F 11/302* (2013.01); *G06F 11/3034* (2013.01); *G06F 11/3055* (2013.01); *G06F 2201/865* (2013.01)

(58) Field of Classification Search
None
See application file for complete search history.

(56) References Cited

U.S. PATENT DOCUMENTS

| 5,467,361 | A | 11/1995 | Shipman, Jr. | |
| 5,537,566 | A | 7/1996 | Konno et al. | |
| 5,628,013 | A * | 5/1997 | Anderson | G06F 9/4887 718/107 |
| 5,680,539 | A | 10/1997 | Jones | |
| 5,958,066 | A | 9/1999 | Kedem | |
| 6,405,327 | B1 * | 6/2002 | Sipple | G06F 11/324 714/39 |
| 6,467,054 | B1 * | 10/2002 | Lenny | G06F 11/004 369/53.17 |
| 6,715,006 | B1 * | 3/2004 | Hotta | G06F 3/0613 710/40 |
| 7,137,038 | B2 | 11/2006 | New et al. | |
| 7,478,018 | B1 * | 1/2009 | Lavallee | H04L 12/2697 703/2 |
| 7,490,261 | B2 | 2/2009 | Gaertner et al. | |
| 7,716,672 | B2 | 5/2010 | Douceur et al. | |

(Continued)

OTHER PUBLICATIONS

Mi et al., "Efficient Management of Idleness in Storage Systems", ACM Transactions on Computational Logic, vol. V, No. N, Month 20YY, pp. 1-24.

(Continued)

*Primary Examiner* — Ann J Lo
*Assistant Examiner* — Chie Yew
(74) *Attorney, Agent, or Firm* — Isaac J. Gooshaw (57) ABSTRACT A computer receives data from a storage device. The computer identifies a state value of the storage device and at least one maintenance task included in the received data. The computer generates a set of instructions for limiting the workload of a storage device executing maintenance tasks. According to the generated instructions, the computer limits the workload placed on the storage device.

15 Claims, 4 Drawing Sheets (56) References Cited

U.S. PATENT DOCUMENTS

| | | | |
|---|---|---|---|
| 7,882,314 B2 | 2/2011 | Allison et al. | |
| 7,945,752 B1* | 5/2011 | Miller et al. | 711/162 |
| 8,010,742 B2 | 8/2011 | Molaro et al. | |
| 8,751,699 B1* | 6/2014 | Tsai et al. | 710/17 |
| 9,563,532 B1* | 2/2017 | Hundt | G06F 11/3409 |
| 2003/0187905 A1* | 10/2003 | Ambilkar | G06F 9/30101 |
| | | | 718/100 |
| 2004/0052045 A1* | 3/2004 | Botchek | 361/685 |
| 2007/0180195 A1* | 8/2007 | McBride | G06F 12/1027 |
| | | | 711/140 |
| 2008/0091905 A1* | 4/2008 | Brittain et al. | 711/167 |
| 2008/0168219 A1* | 7/2008 | Molaro | G06F 11/1435 |
| | | | 711/112 |
| 2008/0222640 A1* | 9/2008 | Daly | G06F 9/4881 |
| | | | 718/103 |
| 2008/0307164 A1* | 12/2008 | Sinclair | G06F 12/0246 |
| | | | 711/135 |
| 2009/0037934 A1* | 2/2009 | Sullivan | 719/317 |
| 2009/0055829 A1* | 2/2009 | Gibson | G06F 9/4881 |
| | | | 718/103 |
| 2010/0153680 A1* | 6/2010 | Baum | G06F 11/008 |
| | | | 711/173 |
| 2012/0005423 A1* | 1/2012 | Zhuang et al. | 711/114 |
| 2012/0140768 A1* | 6/2012 | Hughes | H04L 49/10 |
| | | | 370/389 |
| 2012/0271480 A1* | 10/2012 | Anderson | G06F 1/206 |
| | | | 700/299 |

OTHER PUBLICATIONS

Mi et al., "Restrained Utilization of Idleness for Transparent Scheduling of Background Tasks", SIGMETRICS/Performance'09, Jun. 15-19, 2009, Seattle, WA, USA. Copyright 2009 ACM 978-1-60558-511-Jun. 9, 2006, pp. 205-216.

Thereska et al., "A framework for building unobtrusive disk maintenance applications", FAST '04 Paper.

* cited by examiner

COMMUNICATING OUTSTANDING MAINTENANCE TASKS TO IMPROVE DISK DATA INTEGRITY

FIELD OF THE INVENTION

The present invention relates generally to the field of data management and more particularly to performing maintenance tasks on storage devices.

BACKGROUND OF THE INVENTION

When applications require large amounts of storage, many hard drives or other data storage devices are combined together, for example, disk arrays or RAID (Redundant Array of Independent Disks) arrays. These use multiple drives combined for increased storage, better performance, or greater reliability.

When data is written to the drive, magnetic interference can cause the data in nearby sections to become weaker or be destroyed. To reduce the loss of data, disks use background processes, which continuously scan the disk and check for data issues that could lead to the contained information becoming unrecoverable. For example, a section of data that is repeatedly re-written can cause electrical charge interference to adjacent tracks. In another example, a block of data can become unreadable either due to a physical obstruction on the disk, damage from impact, or damage due to normal use of the disk.

A known method of protecting hard drives, in order to increase the reliability and longevity of the drive, is to use S.M.A.R.T. (Self-Monitoring, Analysis, and Reporting Technology) technology. S.M.A.R.T. measures crucial parameters such as operating temperature, spin-up time, and data error rates. Certain trends and sudden changes in these parameters are thought to be associated with increased likelihood of drive failure and data loss.

Another known method for protecting disks is background scrubbing or scanning, where the hard disk controller reads through the entire disk and checks for errors. If an error is found, the error is corrected using either a backup of the data, or a parity check to determine the piece of data that is corrupted or missing. In general, this process individually corrects errors before they compound, which can generate more severe or uncorrectable errors.

SUMMARY

Embodiments of the present invention disclose a method, computer program product, and system for adapting a workload placed on a storage device. A computer receives data from a storage device. The computer identifies a state value of the storage device and at least one maintenance task included in the received data. The computer generates a set of instructions for limiting the workload of a storage device executing maintenance tasks. The computer limits the workload placed on a storage device according to generated instructions.

DETAILED DESCRIPTION

When data is written to a storage device, magnetic interference can cause data in nearby sections of the storage device to become weaker or destroyed. To reduce the loss of data, storage devices use maintenance tasks to continuously scan the disk and check for data issues that could lead to the contained information becoming unrecoverable. In the present invention, to reduce the loss of data, the computer identifies a state value of an included storage device and a maintenance task to be executed on that storage device. The computer generates a set of instructions to limit the workload of the storage device based on the state value. Using the generated instructions, the computer then limits the workload placed on the storage device such that the maintenance task can be completed without interruption.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
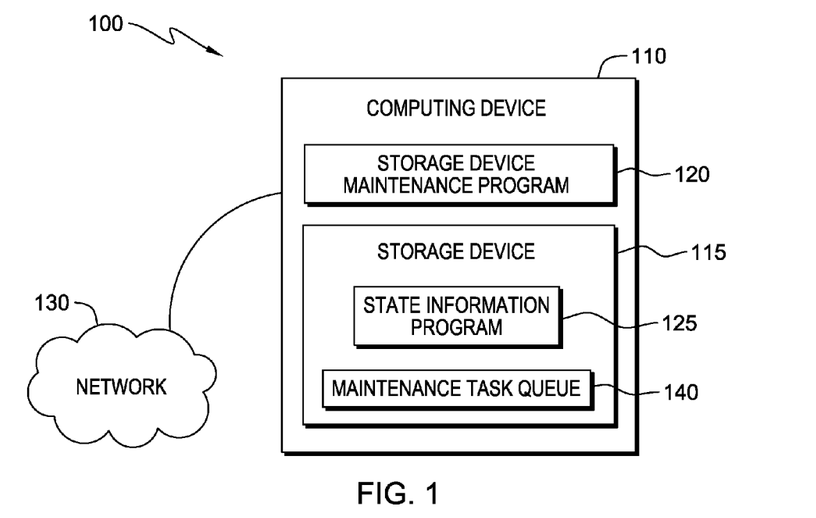
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. Data processing environment 100 includes computing device 110, which includes storage device maintenance program 120, storage device 115, maintenance task queue 140, and state information program 125.

In various embodiments of the present invention, computing device 110 and storage device 115 are computing devices that can be a standalone devices, servers, laptop computers, tablet computers, netbook computers, personal computers (PCs), or desktop computers. In another embodiment, computing device 110 or storage device 115 represent a computing system utilizing clustered computers and components to act as a single pool of seamless resources. In general, computing device 110 can be any computing device or a combination of devices with access to storage device maintenance program 120, storage device 115, maintenance task queue 140, and state information program 125 and is capable of executing storage device maintenance program 120. In general, storage device 115 can be any storage device, computing device, or combination of devices with access to storage media 230, computing device 110, maintenance task queue 140, and state information program 125, and is capable of executing state information program 125. Computing device 110 and storage device 115 may include internal and external hardware components, as depicted and described in further detail with respect to FIG. 5.

In an exemplary embodiment, storage device maintenance program 120, storage device 115, maintenance task queue 140, and state information program 125 are stored on computing device 110. However, in other embodiments, storage device maintenance program 120, storage device 115, maintenance task queue 140, and state information program 125 may be stored externally and accessed through a communication network, such as network 130. Network 130 can be, for example, a local area network (LAN), a wide area network (WAN) such as the internet, or a combination of the two, and may include wired, wireless, fiber optic or any other connection known in the art. In general, network 130 can be any combination of connections and protocols that will support communications between computing device 110, storage device maintenance program 120, storage device 115, state information program 125, maintenance task queue 140, and storage device maintenance program 120 in accordance with a desired embodiment of the present invention.

In exemplary embodiments, storage device maintenance program 120 collects and analyzes data from storage device 115, for example, a quantity of queued maintenance tasks within maintenance task queue 140, a duration of queued maintenance tasks within maintenance task queue 140, and an idle time between read or write tasks. Storage device maintenance program 120 uses the collected information to adjust the load of read and write tasks placed on storage device 115 so that the queued maintenance tasks within maintenance task queue 140 can be executed without being interrupted. Storage device maintenance program 120 is described in FIG. 4.

Storage device 115 can be a Hard Disk Drive (HDD), Solid State Drive (SSD), Random Access Memory (RAM), Electrically Erasable Programmable Read Only Memory (EEPROM), Erasable Programmable Read Only Memory (EPROM), flash memory, or any electronic storage medium that facilitates the storage of data. Storage device 115 may include internal and external hardware components, as depicted and described in further detail with respect to FIG. 5.

In exemplary embodiments, state information program 125 collects data from storage device 115 including, for example, a background scan status, such as a Background Media Scan™ status, a quantity of queued maintenance tasks within maintenance task queue 140, a duration of maintenance tasks within maintenance task queue 140, and an idle time between read or write tasks. In one embodiment, state information program 125 utilizes the collected information to determine the state of storage device 115 with respect to the maintenance tasks within maintenance task queue 140.

Figure 2:
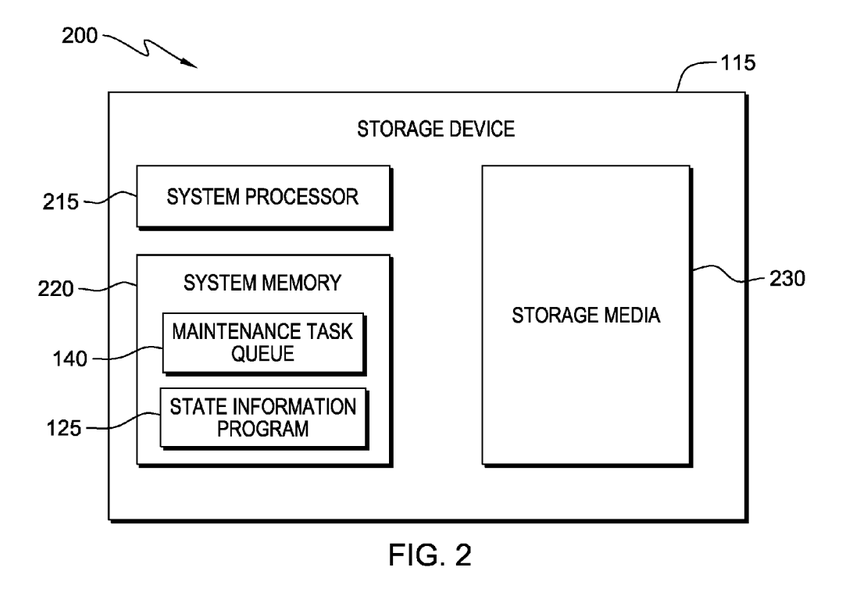
FIG. 2 is a block diagram depicting components included in the storage device within the data processing environment of FIG. 1, in accordance with an embodiment of the present invention.

FIG. 2 is a block diagram of certain components included in storage device 115, generally designated 200, in accordance with an embodiment of the present invention. Storage device 115 includes system processor 215, system memory 220, maintenance task queue 140, and storage media 230.

Storage device 115 utilizes system processor 215 to control certain operations of storage device 115. System processor 215 can be any microprocessor or data processing device capable of executing state information program 125. In accordance with an embodiment of the present invention, storage device 115 uses system processor 215 to examine maintenance task queue 140 and determine the current state level of storage device 115. System processor 215 regulates the read and write operations of storage device 115 with the use of programming stored in system memory 220. System memory 220 can be Random Access Memory (RAM), Read Only Memory (ROM), or any computer readable storage media that is capable of storing state information program 125 and other programming needed to facilitate the operation of storage device 115. Storage media 230 can be a hard disk drive, SSD, EPROM, EEPROM, flash memory, or any computer readable storage media capable of storing data.

Figure 3:
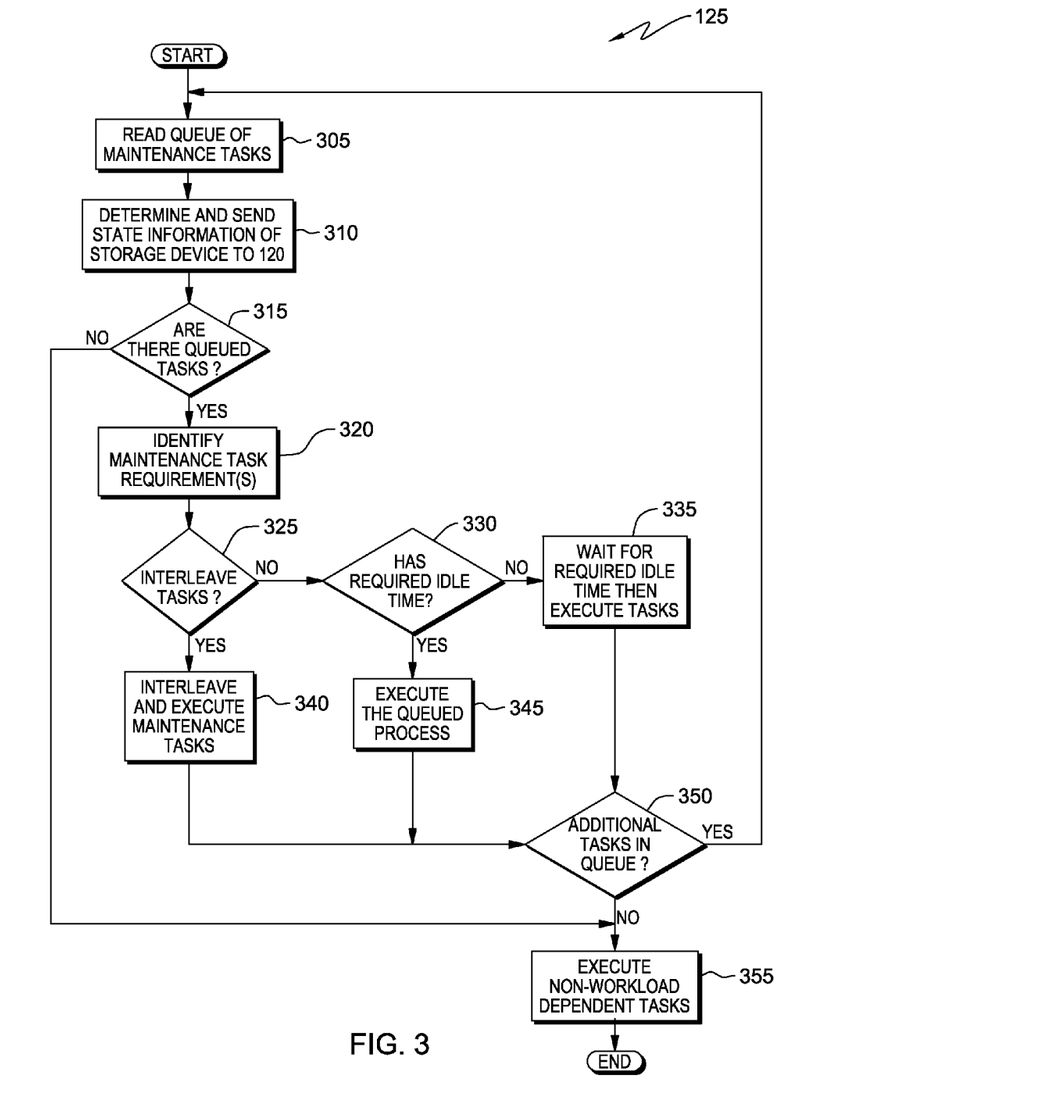
FIG. 3 is a flowchart depicting the operational steps of a state information program, executing on a storage device within the data processing environment of FIG. 1, in accordance with an embodiment of the present invention.

FIG. 3 is a flowchart depicting operational steps of state information program 125 for determining and sending the current state of storage device 115 to computing device 110, as well as executing maintenance tasks within maintenance task queue 140 on storage device 115, in accordance with an embodiment of the present invention.

State information program 125 collects and reads maintenance task queue 140, step 305. The current state of storage device 115 with regards to maintenance task queue 140 is determined and sent to computing device 110 in step 310. State information program 125 determines the state of storage device 115 based, at least in part, on one or more of a) the quantity of maintenance tasks, b) the idle times required for a maintenance task, and c) a duration of a maintenance task. In this exemplary embodiment of the present invention, state information program 125 assigns a number between one and five representing a state value based, at least in part, on the quantity and importance of the maintenance tasks to be executed on storage device 115, where higher numbers indicate a more critical state of storage device 115. For example, if maintenance task queue 140 contains no maintenance tasks, storage device 115 is assigned a state value of one by state information program 125, while if maintenance task queue 140 contains four maintenance tasks waiting for short idle times, storage device 115 is assigned a state value of three by state information program 125. Further, if maintenance task queue 140 contains forty maintenance tasks that cannot be completed in a timely manner, storage device 115 is assigned a state value of five by state information program 125.

In decision step 315, state information program 125 determines if there are maintenance tasks in maintenance task queue 140. If state information program 125 determines that no maintenance tasks are present in maintenance task queue 140 (decision step 315, no branch), then storage device 115 will continue with executing non-workload dependent tasks, in step 355. Step 355 corresponds to a storage device with a state value of one where no maintenance tasks are present within maintenance task queue 140, wherein both storage device 115 and computing device 110 will continue with normal operation.

If state information program 125 determines that there are maintenance tasks present in maintenance task queue 140 (decision step 315, yes branch), state information program 125 identifies the requirements of the current maintenance task to determine how to proceed with the execution of said maintenance task in step 320. Such requirements can include, for example, a required idle time before executing a maintenance task, and/or a need to interleave the execution of a task between requests for I/O.

In decision step 325, state information program 125 determines whether the next queued maintenance task needs to be interleaved between requests for I/O while being executed. If state information program 125 determines that the next queued maintenance task needs to be interleaved, (decision step 325, yes branch), then the maintenance task is interleaved between requests for I/O and executed immediately, continuing until completion, in step 340. The process of interleaving the execution of a maintenance task consists of alternating between the execution of a request for I/O and a maintenance task, executing both sequentially until both the maintenance task and requests for I/O are completed. The maintenance task executed during step 340 will execute until completion regardless of whether or not there are requests for I/O because of the high importance associated with maintenance tasks that must be interleaved. Once the maintenance task is finished executing, state information program 125 will continue to decision step 350.

If the next queued maintenance task does not need to be interleaved between requests for I/O (decision step 325, no branch), then state information program 125 determines whether the idle time required to execute the maintenance task is present, in decision step 330. Because of the low importance associated with executing tasks that do not need to be interleaved, storage device 115 executes these tasks once their required disk idle time is present. Further, because of the low importance of said non-interleaved maintenance tasks, requests for I/O that are processed by storage device 115 during the execution of the maintenance task will halt the execution of the maintenance task.

If state information program 125 determines that the idle time required by the next queued maintenance task is present (decision step 330, yes branch), then the queued maintenance task is executed on storage device 115. Because of the low importance of non-interleaved maintenance tasks, execution of the task will continue either until completion or until interrupted by a request for I/O from the drive. Once the maintenance task is finished executing, state information program 125 continues to decision step 350.

If state information program 125 determines that the idle time that the next queued maintenance task requires is not present (decision step 330, no branch), then state information program 125 waits for the required idle time before executing the next queued maintenance tasks (step 335). Once the required idle time is present, state information program 125 executes the queued maintenance task on storage device 115 which continues execution either until completion or until interrupted by a request for I/O. Similar to step 345, the maintenance tasks executed in step 335 are of low importance and will be interrupted and halted if a request for I/O is present during the execution of said maintenance task. Once the maintenance task is finished executing, state information program 125 determines if there are additional maintenance tasks present in maintenance task queue 140 in decision step 350. If additional maintenance tasks are present in maintenance task queue 140, state information program 125 will continue executing again from step 305 (decision step 350, yes branch). If no additional maintenance tasks are present in maintenance task queue 140, state information program 125 continues with executing non-workload dependent tasks in step 355.

Figure 4:
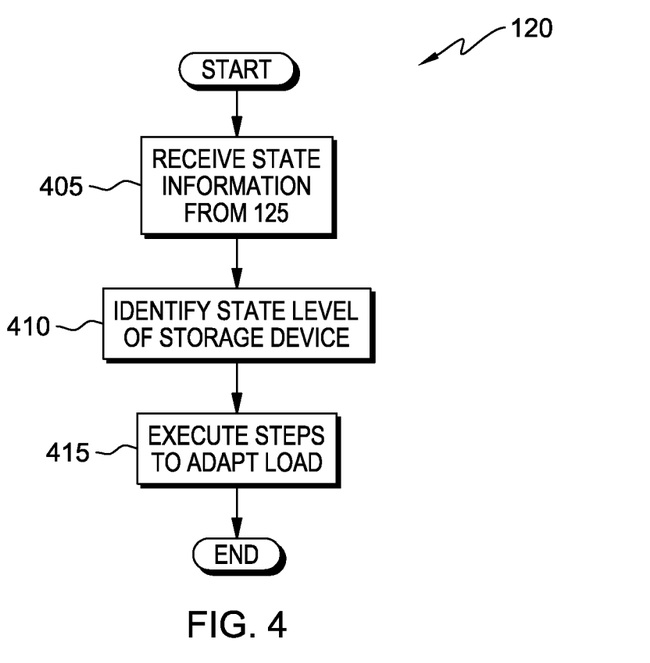
FIG. 4 is a flowchart depicting the operational steps of a storage device maintenance program, executing on the computing device the within the data processing environment of FIG. 1, in accordance with an embodiment of the present invention.

FIG. 4 is a flowchart depicting the operational steps of storage device maintenance program 120 operating on storage device 115 in accordance with an illustrative embodiment of the present invention.

Storage device maintenance program 120 receives state information from state information program 125, in step 405. The state information is based, at least in part, on one or more of a) the determined state of the storage device b) the quantity of maintenance tasks present in the queue, c) the duration of a maintenance task, and d) an error in the execution of a maintenance task.

Storage device maintenance program 120 analyzes the information received in step 405 and identifies the state level of storage device 115 (step 410). In this exemplary embodiment, the state value is a number between one and five determined, at least in part, based on the quantity and importance of the maintenance tasks within maintenance task queue 140 to be executed.

Storage device maintenance program 120 adapts the load placed on storage device 115 in step 415. Based on the determined state level, the load is adapted by completing one or more of a) disabling a subset of monitoring commands, b) going to the secondary device for read requests, c) store read and write commands in the cache, d) perform a RAID extract instead of reading the full copy of the data off of storage device 115, and e) trigger a proactive failure of storage device 115. For example, if storage device maintenance program 120 determines that storage device 115 has a state value of three, computing device 110 may act by performing a RAID extract from a set of redundant drives. Further, if storage device maintenance program 120 determines that storage device 115 has a state value of five; computing device 110 will act by triggering a proactive failure of storage device 115.

Figure 5:
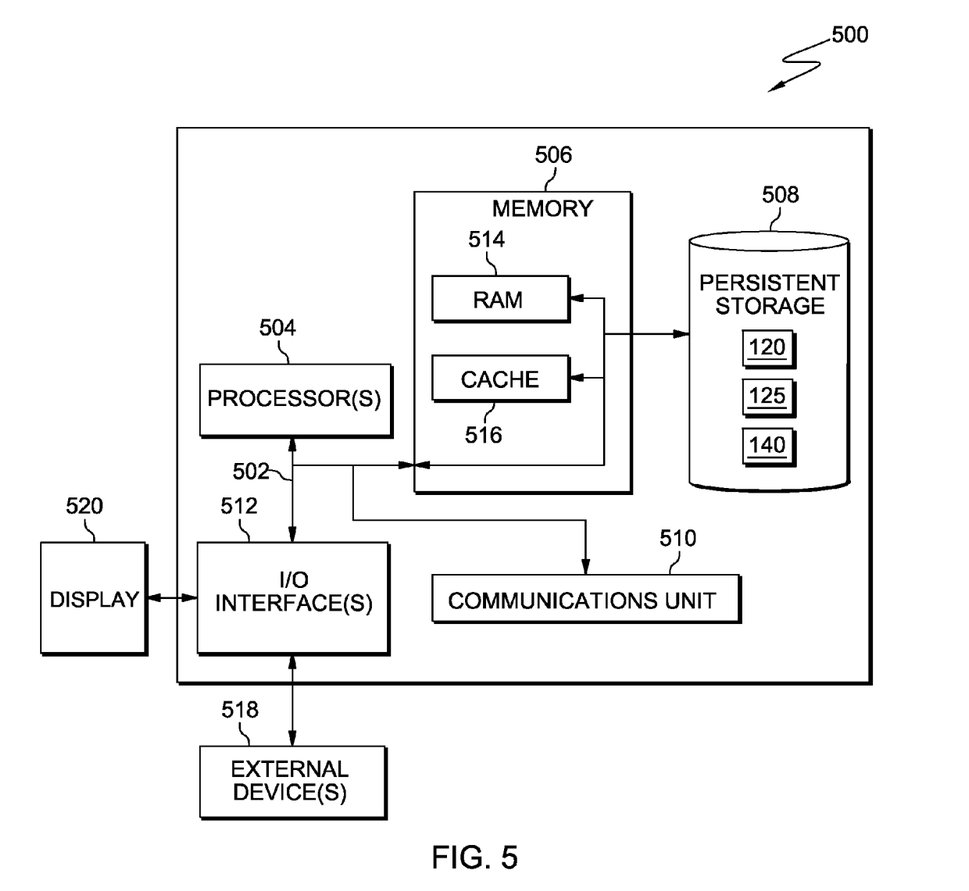
FIG. 5 depicts a block diagram of components of the computing device executing the storage device maintenance program, and components of the storage device executing the state information program, in accordance with an embodiment of the present invention.

FIG. 5 depicts a block diagram of components of computing device 110 and storage device 125, generally designated 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 and storage device 125 include respective communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Storage device maintenance program 120, maintenance task queue 140, and state information program 125 are respectively stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of Network 130. In these examples, communications unit 510 includes one or more network interface cards. Communications unit 510 may provide communications through the use of either or both physical and wireless communications links. Storage device maintenance program 120, state information program 125, and maintenance task queue 140 may be downloaded to persistent storage 508 through communications unit 510.

I/O interface(s) 512 allows for input and output of data with other devices that may be connected to computing device 110 or storage device 125. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., storage device maintenance program 120, maintenance task queue 140, and state information program 125, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   receiving, by one or more processors, information indicative of at least one maintenance task queued for operation on a storage device;
   receiving, by the one or more processors, state information associated with the storage device;
   identifying, by the one or more processors, at least one requirement of the at least one maintenance task;
   in response to the at least one requirement of the at least one maintenance task indicating an interleave requirement, interleaving, by the one or more processors, (i) one or more operations of the at least one maintenance task indicating an interleave requirement with (ii) one or more incoming input/output (I/O) operations sent to the storage device;
   in response to the at least one requirement of the at least one maintenance task indicating a non-interleave requirement, identifying, by the one or more processors, an idle time associated with the storage device; and
   in response to the idle time associated with the storage device exceeding a pre-determined threshold, executing, by the one or more processors, one or more operations of the at least one maintenance task indicating the non-interleave requirement.

2. The method of claim 1, wherein the state information associated with the storage device includes following: (i) a quantity of queued maintenance tasks; (ii) idle times associated with the queued maintenance tasks; (iii) duration times associated with the queued maintenance tasks; and (iv) any errors in execution of the queued maintenance tasks.

3. The method of claim 2, the method further comprising:
   determining, by the one or more processors, a state level associated with the storage device based, at least in part, on the state information.

4. The method of claim 3, the method further comprising:
   adapting, by the one or more processors, an execution load for the storage device based, at least in part, on the state level associated with the storage device.

5. The method of claim 4, wherein adapting the execution load for the storage device comprises one or more of the following operations: (i) disabling a subset of monitoring commands for the storage device; (ii) sending read requests to a secondary device; (iii) storing read and write commands in a cache associated with the storage device; (iv) performing a RAID extract of storage device; and (v) triggering a proactive failure of storage device.

6. A computer program product comprising:
   one or more computer-readable storage media and program instructions stored on the one or more computer-readable storage media, the program instructions comprising:
   program instructions to receive information indicative of at least one maintenance task queued for operation on a storage device;
   program instructions to receive state information associated with the storage device;
   program instructions to identify at least one requirement of the at least one maintenance task;
   in response to the at least one requirement of the at least one maintenance task indicating an interleave requirement, program instructions to interleave (i) one or more operations of the at least one maintenance task indicating an interleave requirement with (ii) one or more incoming input/output (I/O) operations sent to the storage device;
   in response to the at least one requirement of the at least one maintenance task indicating a non-interleave requirement, program instructions to identify an idle time associated with the storage device; and
   in response to the idle time associated with the storage device exceeding a pre-determined threshold, program instructions to execute one or more operations of the at least one maintenance task indicating the non-interleave requirement.

7. The computer program product of claim 6, wherein the state information associated with the storage device includes following: (i) a quantity of queued maintenance tasks; (ii) idle times associated with the queued maintenance tasks; (iii) duration times associated with the queued maintenance tasks; and (iv) any errors in execution of the queued maintenance tasks.

8. The computer program product of claim 7, the program instructions further comprising:
   program instructions to determine a state level associated with the storage device based, at least in part, on the state information.

9. The computer program product of claim 8, the program instructions further comprising:
   program instructions to adapt an execution load for the storage device based, at least in part, on the state level associated with the storage device.

10. The computer program product of claim 9, wherein program instructions to adapt the execution load for the storage device comprises one or more of the following operations: (i) disabling a subset of monitoring commands for the storage device; (ii) sending read requests to a secondary device; (iii) storing read and write commands in a cache associated with the storage device; (iv) performing a RAID extract of storage device; and (v) triggering a proactive failure of storage device.

11. A computer system comprising:
    one or more computer processors;
    one or more computer readable storage media; and
    program instructions stored on the computer readable storage media for execution by at least one of the one or more processors, the program instructions comprising:
    program instructions to receive information indicative of at least one maintenance task queued for operation on a storage device;
    program instructions to receive state information associated with the storage device;
    program instructions to identify at least one requirement of the at least one maintenance task;

in response to the at least one requirement of the at least one maintenance task indicating an interleave requirement, program instructions to interleave (i) one or more operations of the at least one maintenance task indicating an interleave requirement with (ii) one or more incoming input/output (I/O) operations sent to the storage device;

in response to the at least one requirement of the at least one maintenance task indicating a non-interleave requirement, program instructions to identify an idle time associated with the storage device; and in response to the idle time associated with the storage device exceeding a pre-determined threshold, program instructions to execute one or more operations of the at least one maintenance task indicating the non-interleave requirement.

12. The computer system of claim 11, wherein the state information associated with the storage device includes following: (i) a quantity of queued maintenance tasks; (ii) idle times associated with the queued maintenance tasks; (iii) duration times associated with the queued maintenance tasks; and (iv) any errors in execution of the queued maintenance tasks.

13. The computer system of claim 12, the program instructions further comprising:

program instructions to determine a state level associated with the storage device based, at least in part, on the state information.

14. The computer system of claim 13, the program instructions further comprising:

program instructions to adapt an execution load for the storage device based, at least in part, on the state level associated with the storage device.

15. The computer system of claim 14, wherein program instructions to adapt the execution load for the storage device comprises one or more of the following operations: (i) disabling a subset of monitoring commands for the storage device; (ii) sending read requests to a secondary device; (iii) storing read and write commands in a cache associated with the storage device; (iv) performing a RAID extract of storage device; and (v) triggering a proactive failure of storage device.

* * * * *